United States Patent [19]

Hofmann et al.

[11] Patent Number: 4,589,638
[45] Date of Patent: May 20, 1986

[54] DECOUPLING DIAPHRAGM FOR TWO-CHAMBER ENGINE MOUNTS

[75] Inventors: Manfred Hofmann, Hünfelden; Karl-Heinz Klöckner, Niederwerth, both of Fed. Rep. of Germany

[73] Assignee: Metzeler Kautschuk GmbH, Munich, Fed. Rep. of Germany

[21] Appl. No.: 625,460

[22] Filed: Jun. 28, 1984

[30] Foreign Application Priority Data

Jun. 28, 1983 [DE] Fed. Rep. of Germany ....... 3323178

[51] Int. Cl.[4] .......................... F16F 1/36; F16F 15/04
[52] U.S. Cl. .................................... 267/8 R; 188/379; 267/63 A; 267/140.1; 267/153
[58] Field of Search .............. 267/8 R, 8 D, 35, 63 R, 267/63 A, 64.23, 64.27, 113, 140.1, 141, 141.3, 141.4, 141.5, 141.6, 141.7, 152, 153, 140.2, 140.3, 8 B, 8 C, 8 A, 9 R, 9 A, 9 B, 9 C, 10; 188/378, 379, 380; 248/562, 565, 566, 636; 180/312

[56] References Cited

U.S. PATENT DOCUMENTS

| 2,854,232 | 9/1958 | Boschi ............................... 267/63 R |
| 4,288,063 | 9/1981 | Brenner et al. ..................... 267/8 R |
| 4,352,487 | 10/1982 | Shtarkman ..................... 267/8 R X |

FOREIGN PATENT DOCUMENTS

| 1214479 | 4/1966 | Fed. Rep. of Germany .... 267/63 R |
| 2652501 | 5/1978 | Fed. Rep. of Germany ... 267/63 A |
| 2802896 | 7/1979 | Fed. Rep. of Germany .... 267/63 R |
| 2947018 | 5/1981 | Fed. Rep. of Germany ... 267/140.1 |
| 3024091 | 1/1982 | Fed. Rep. of Germany . |
| 3125040 | 3/1983 | Fed. Rep. of Germany ...... 188/380 |
| 1281685 | 12/1961 | France ................................ 267/153 |
| 2500555 | 8/1982 | France ............................. 267/64.23 |
| 56-66539 | 6/1981 | Japan ................................. 267/140.1 |

Primary Examiner—Bruce H. Stoner, Jr.
Assistant Examiner—Richard R. Diefendorf
Attorney, Agent, or Firm—Herbert L. Lerner; Laurence A. Greenberg

[57] ABSTRACT

A decoupling device for engine mounts having upper and lower liquid chambers containing hydraulic fluid for damping vibrations, includes a diaphragm liquid-tightly fastened to an upper region of the upper liquid chamber defining a diaphragm chamber divided-off from the upper liquid chamber, the diaphragm including a circular rubber body and a vibration-cancelling mass in the form of a central, circular, metallic disc adhering to the circular rubber body, the circular rubber body having upper and lower surfaces, each of the surfaces having two concentric, conical, circular slots formed therein being inclined toward each other as seen in direction from the horizontal central plane of the circular rubber body toward the surfaces thereof, and the slots being extended to the vicinity of the horizontal central plane of the circular rubber body.

7 Claims, 3 Drawing Figures

DECOUPLING DIAPHRAGM FOR TWO-CHAMBER ENGINE MOUNTS

The invention relates to a decoupling diaphragm for two-chamber engine mounts with hydraulic damping, especially for motor vehicles, including a circular rubber body and a central, metallic, circular disc forming a cancelling or quenching mass, which are connected to each other with firm adhesion and are fastened liquid-tightly in the upper region of the upper liquid chamber for dividing-off a diaphragm chamber.

Such a decoupling diaphragm, although formed of elastomer material throughout, is known from German Published, Non-Prosecuted Application. DE-OS 30 24 091.

In co-pending U.S. application Ser. No. 556,634, filed Nov. 30, 1983, a decoupling diaphragm is described which, similar to the invention of the instant application, is formed of a very soft circular rubber body and a central metallic cancelling mass. The purpose of using such a decoupling diaphragm in a hydraulically damped engine mount, is to ensure decoupling of small amplitudes in the order of magnitude of about 0.1 mm, so as to provide optimum insulation of the acoustical behavior as well as of the vibrations introduced.

However, with the conventional structure of the annular rubber body in the form of a very soft planar ring plate or a corrugated ring washer, the danger exists that in the case of larger excursions, the metallic cancelling mass will strike the upper end wall of the mount and thereby generate undesired noise. In addition, the vibration travel of the cancelling mass that occurs is difficult to determine or to define accurately.

It is accordingly an object of the invention to provide a decoupling diaphragm for two-chamber engine mounts, which overcomes the hereinafore-mentioned disadvantages of the heretofore-known devices of this general type, and which has a practically integrated travel limitation for vertical vibrational motions of the cancelling mass, in order to thereby reach an accurately defined maximum excursion and to be able to set it.

With the foregoing and other objects in view there is provided, in accordance with the invention, a decoupling device for engine mounts, especially for motor vehicles, having upper and lower liquid chambers containing hydraulic fluid for damping vibrations, comprising a diaphragm liquid-tightly fastened to an upper region of the upper liquid chamber defining a diaphragm chamber divided-off from the upper liquid chamber, the diaphragm including a circular rubber body and a vibration-cancelling mass in the form of a central, circular, metallic disc adhering to the circular rubber body with strong adhesion, the circular rubber body having upper and lower surfaces, each of the surfaces having two concentric, conical, circular slots formed therein being inclined toward each other as seen in direction from the horizontal central plane of the circular rubber body toward the surfaces thereof, and the slots being extended to the vicinity of the horizontal central plane of the circular rubber body.

The formation of such conical circular slots permits a relatively free vertical mobility of the cancelling mass, for a presettable travel distance. Meanwhile, adjacent sides of two diametrically opposite slots on the upper and lower side of the diaphragm meet each other and thereby counteract further vertical motion of the cancelling mass, except for the permanent elasticity of the solid rubber body.

In accordance with another feature of the invention, the circular rubber body has a respective circular enlargement formed therein at the bottom of each of the slots.

In accordance with a further feature of the invention, the slots formed in the upper and lower surfaces of the circular rubber body are mutually symmetrical with respect to the horizontal central plane of the circular rubber body.

In accordance with an added feature of the invention, the conicity of the slots is between 15° and 30° or 20° and 25°.

In accordance with an additional feature of the invention, the height-to-width ratio of the circular slots is substantially between 3:1 and 4:1.

In accordance with a concomitant feature of the invention, there is provided a metal ring surrounding and adhering to said circular rubber body, with strong adhesion.

Other features which are considered as characteristic for the invention are set forth in the appended claims. Although the invention is illustrated and described herein as embodied in a decoupling diaphragm for two-chamber engine mounts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
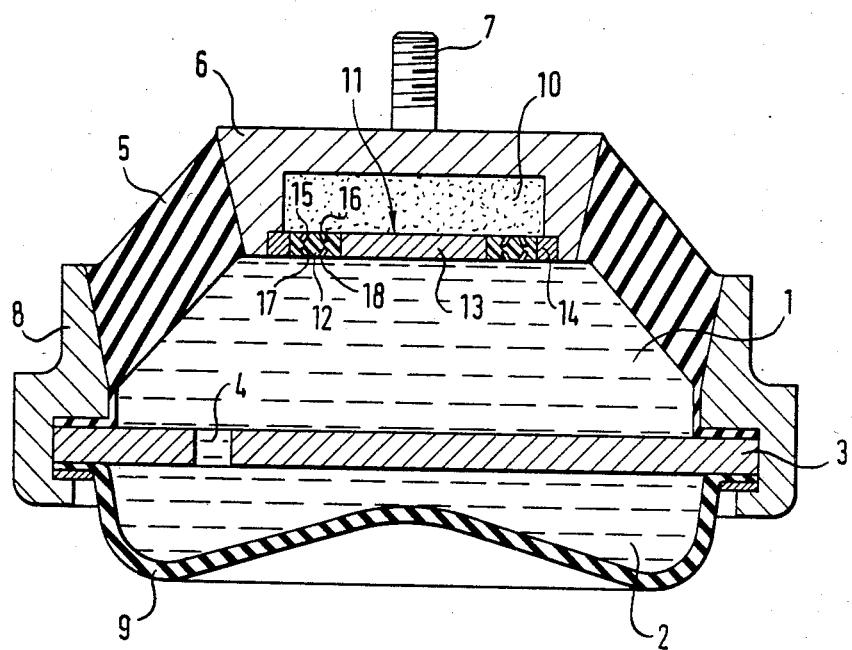
FIG. 1 is a diagrammatic, cross-sectional view of the overall structure of a two-chamber engine mount according to the invention.

Referring now to the figures of the drawings in detail and first particularly to FIG. 1 thereof, there is seen a two-chamber engine mount substantially formed of an upper chamber 1 on the engine side and a lower chamber 2, which are filled with a hydraulic liquid and are separated from each other by an elastically supported intermediate plate 3 having a choke opening 4 formed therein. The upper chamber 1 is formed by a hollow, conical, heavy chamber wall 5 formed of rubber-elastic material, which is terminated or closed-off at the upper surface thereof by an engine mount plate 6 having a threaded stud 7 attached thereto. The lower outer periphery of the chamber wall 5 is connected to an annular abutment 8 with a strong adhesion. The lower chamber 2 is also formed by a chamber wall 9 of rubber-elastic material, which may be cup-shaped A cylindrical cavity 10 is formed in the lower surface of the engine mount plate 6, forming a diaphragm chamber which is closed-off from the upper chamber 1 by a decoupling diaphragm 11. The diaphragm 11 is formed of a washer-shaped rubber body 12 and a central metallic cancelling mass 13, which are connected to each other with a strong adhesion. The outer periphery of the rubber body 12 is enclosed by a metal ring 14 for mounting and securing in the engine mount plate 6.

According to the invention, the rubber body 12 has two circular slots 15 and 16 formed in the upper surface thereof, which are conically inclined relative to each other. The lower surface of the rubber body 12 has two circular slots 17 and 18 formed therein, which are symmetrical to the slots 15, 16.

Figure 2:
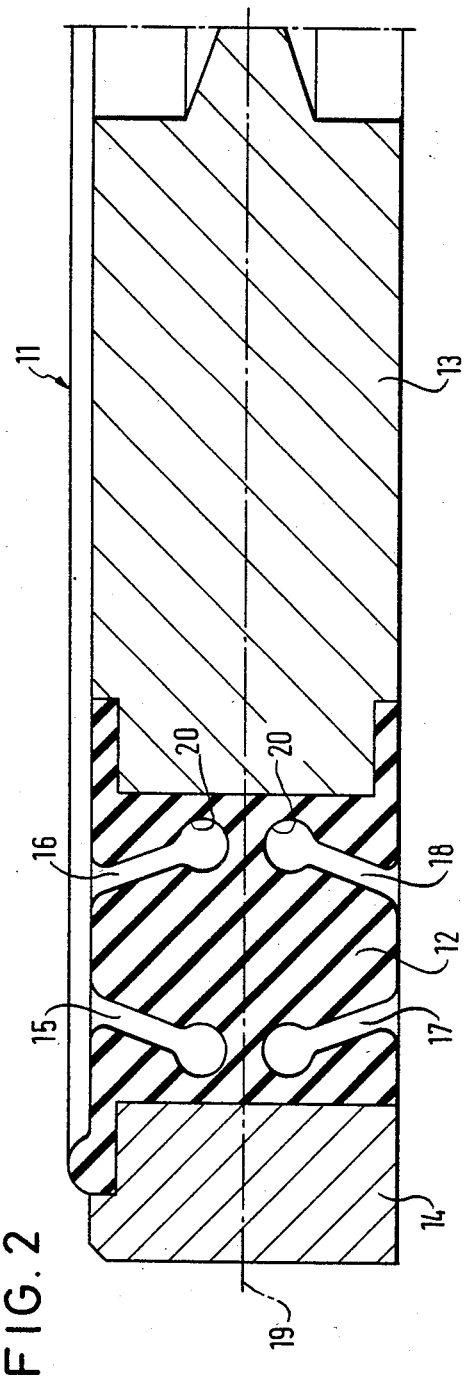
FIG. 2 is an enlarged cross-sectional view of one half of the decoupling diaphragm of FIG. 1.

As can be seen in detail from the enlarged cross-sectional view of FIG. 2 which is taken through the left half of the decoupling diaphragm 11, the two symmectrical outer slots 15 and 17 (which are opposite each other with respect to the center plane 19) are inclined inward at an angle of about 20°, and the two inner slots 16 and 18 are inclined outward at the same angle. Depending on the desired permissible excursion of the cancelling or quenching mass 13, the inclination of these slots 15 to 18 may advantageously be in the range of 15° to 30°. The circular slots 15 to 18 are always enlarged at the bottom of the slot with a circular cross section 20 so as to assure greater mobility in the vertical direction. The height-to-width ratio of these circular slots should be about 3:1 to 4:1, which also permits the degree of the permissible excursion to be determined.

Figure 3:
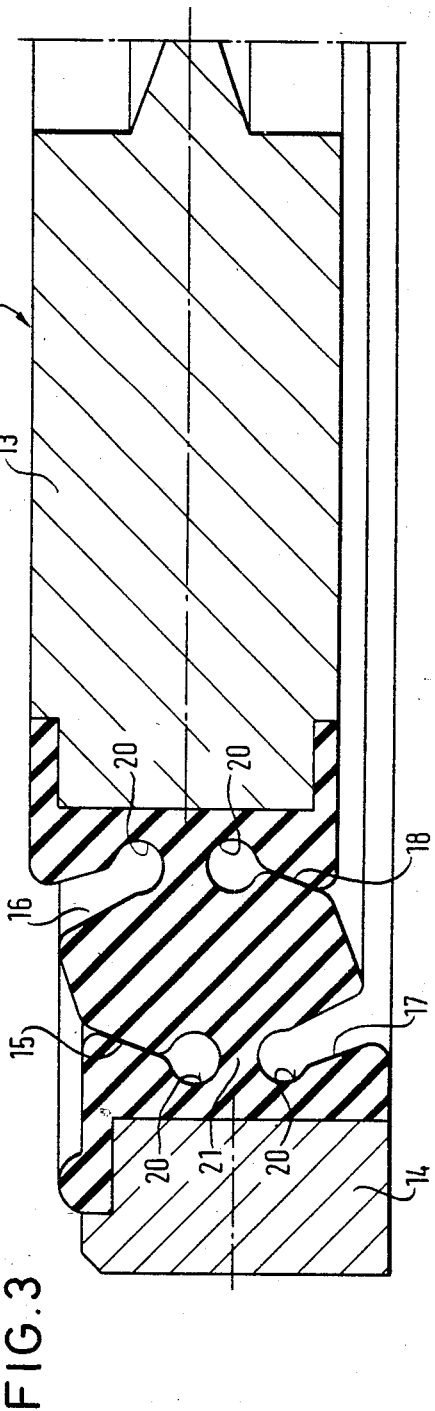
FIG. 3 is a view similar to FIG. 2 of the decoupling diaphragm after the cancelling mass is deflected into the upper end position thereof.

The operation of these circular slots will be explained with respect to FIG. 3. If the cancelling mass 13 which is supported for vibration is excited by an excitation frequency, the mass is set in motion and thereby causes the rubber body 12 to cant. The motion of the cancelling mass 13 shown in FIG. 3 causes the diagonally opposite conical circular gaps 15 and 18 to be closed after a predetermined travel distance, while their lateral surfaces collide softly. Through this closing of the slots and the collision of adjacent material regions of the rubber body caused thereby, an unambiguous limitation of the vertical travel of the cancelling mass 13 is thus obtained, because of the relatively small forces acting on the cancelling mass 13. A defined travel limitation can thus be obtained and the cancelling mass 13 can be prevented from striking the upper end wall of the diaphragm chamber or cavity 10.

In a similar manner, the circular slots 16 and 17 which are still open, would close upon a downward motion of the cancelling mass and thereby set a defined travel limitation in the downward direction.

In order to provide an accurately defined travel limitation, i.e., for minimizing possible residual elasticity of the solid rubber body when the slots are closed, a rubber quality with a higher Shore hardness can also be used. This is because the free mobility of the cancelling mass 13 is still only determined by the thickness of a material region 21 located between mutually opposite slot bottoms 20, due to the relatively deep slot cuts.

We claim:

1. Decoupling device for engine mounts having upper and lower liquid chambers containing hydraulic fluid for damping vibrations, comprising a diaphragm liquid-tightly fastened to an upper region of the upper liquid chamber defining a diaphragm chamber divided-off from the upper liquid chamber, said diaphragm including a circular rubber body having a horizontal central plane and a vibration-cancelling mass in the form of a central, circular, metallic disc adhering to said circular rubber body, said circular rubber body having upper and lower surfaces, each of said surfaces having two concentric, circular slots formed therein being inclined toward each other as seen in direction from the horizontal central plane of said circular rubber body toward said surfaces thereof, and said slots being extended to the vicinity of the horizontal central plane of said circular rubber body.

2. Decoupling device according to claim 1, wherein each of said slots has a given width and said circular rubber body has a respective circular enlargement found therein at the bottom of each of said slots, said enlargement at the bottom of each respective slot having a diameter being larger than said given width of said respective slot.

3. Decoupling device according to claim 1, wherein said slots formed in said upper and lower surfaces of said circular rubber body are mutually symmetrical with respect to the horizontal central plane of said circular rubber body.

4. Decoupling device according to claim 1, wherein the inclination of said slots is between 15° and 30°.

5. Decoupling device according to claim 1, wherein the inclination of said slots is between 20° and 25°.

6. Decoupling device according to claim 1, wherein the height-to-width ratio of said circular slots is substantially between 3:1 and 4:1.

7. Decoupling device according to claim 1, including a metal ring surrounding and adhering to said circular rubber body.

* * * * *